US011752435B2

(12) United States Patent
Nair et al.

(10) Patent No.: US 11,752,435 B2
(45) Date of Patent: Sep. 12, 2023

(54) SYSTEMS AND METHODS FOR BEHAVIOR-BASED CHARACTERIZATION OF AVATARS IN A COMPUTER-GENERATED ENVIRONMENT

(71) Applicant: Rovi Guides, Inc., San Jose, CA (US)

(72) Inventors: Govind Raveendranathan Nair, Bangalore (IN); Sangeeta Parida, Delhi (IN)

(73) Assignee: Rovi Guides, Inc., San Jose, CA (US)

( * ) Notice: Subject to any disclaimer, the term of this patent is extended or adjusted under 35 U.S.C. 154(b) by 15 days.

(21) Appl. No.: 17/377,018

(22) Filed: Jul. 15, 2021

(65) Prior Publication Data
US 2023/0014321 A1 Jan. 19, 2023

(51) Int. Cl.
| | |
|---|---|
| *A63F 13/75* | (2014.01) |
| *G10L 25/51* | (2013.01) |
| *A63F 13/79* | (2014.01) |
| *A63F 13/87* | (2014.01) |
| *A63F 13/67* | (2014.01) |

(52) U.S. Cl.
CPC ............ *A63F 13/75* (2014.09); *A63F 13/67* (2014.09); *A63F 13/79* (2014.09); *A63F 13/87* (2014.09); *G10L 25/51* (2013.01); *A63F 2250/58* (2013.01); *A63F 2300/5586* (2013.01)

(58) Field of Classification Search
None
See application file for complete search history.

(56) References Cited

U.S. PATENT DOCUMENTS

| | | | |
|---|---|---|---|
| 2009/0174702 A1* | 7/2009 | Garbow | A63F 13/12 345/419 |
| 2020/0314152 A1* | 10/2020 | Andre | H04L 67/131 |
| 2022/0032198 A1* | 2/2022 | Orrino | G06N 20/00 |
| 2022/0032199 A1* | 2/2022 | Rudi | A63F 13/75 |
| 2022/0203244 A1* | 6/2022 | Ng | G06N 3/08 |

* cited by examiner

*Primary Examiner* — Jason T Yen
(74) *Attorney, Agent, or Firm* — Haley Guiliano LLP

(57) ABSTRACT

Systems and methods for a computer-based process that detects improper behavior of avatars in a computer-generated environment, and marks these avatars accordingly, so that other users may perceive marked avatars as bad actors. Systems of embodiments of the disclosure may monitor avatar speech, text, and actions. If the system detects behavior it deems undesirable, such as behavior against any laws or rules of the environment, abusive or obscene language, and the like, avatars committing or associated with this behavior are marked in some manner that is visually apparent to other users. In this manner, improperly-behaving avatars may be more easily recognized and avoided, thus improving the experience of other users.

20 Claims, 11 Drawing Sheets

Breach mitigated after 1 foul play

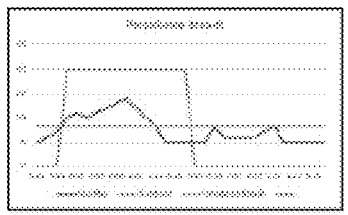

*Data saved with 1 parameter breach:*
    ProfileId: Id_A
    Foul Play: Parameters: <inaction>
    Count: 1
    Levels: <9,10,12>
    Avg Threshold: 8

*Data saved with multiple parameter breach:*
    ProfileId: Id_A
    Foul Play: Parameters: <inaction, non-play etc.>
    Count: 1
    Levels: <8.2,9.1,16>
    Avg Threshold: 8

Multiple foul plays. Foul play count – 2

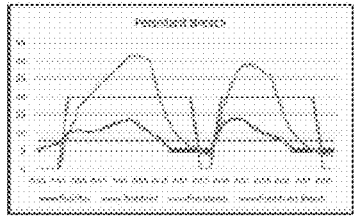

*Data saved with 1 parameter breach:*
    ProfileId: Id_B
    Foul Play: Parameters: <inaction>
    Count: 2
    Levels: <8.1,9.5,15> <- *these are calculated based on foul play count data*
    Avg Threshold: 8

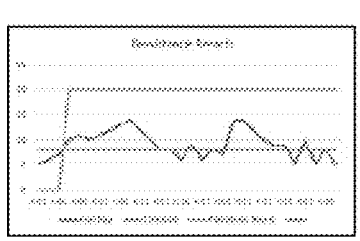

*Data saved with multiple parameter breach:*
    ProfileId: Id_B
    Foul Play: Parameters: <inaction, non-play etc.>
    Count: 2
    Levels: <8.2,9.2,18> <- *these are calculated based on foul play count data and parameter violation data*
    Avg Threshold: 8

FIG. 12

SYSTEMS AND METHODS FOR BEHAVIOR-BASED CHARACTERIZATION OF AVATARS IN A COMPUTER-GENERATED ENVIRONMENT

BACKGROUND

Embodiments of the disclosure are directed generally to computer-generated environments. Embodiments of the disclosure are directed more specifically to systems and methods for behavior-based characterization of avatars in computer-generated environments.

SUMMARY

Contemporary computing systems have sufficient computing resources and communications bandwidth to support services that involve many individuals interacting simultaneously within the same computer-generated environment. For example, many online games now allow many different players to simultaneously interact with each other, all within the same shared virtual environment (e.g., via network connected devices). Multiplayer games such as massively multiplayer online role playing games (MMORPGs) create persistent worlds in which users, through avatars or computer-based representations of characters which are controlled by their users, interact with each other and with their environment.

Such systems are not without their drawbacks, however. As one example, while many computer-generated environments allow users to communicate or otherwise interact with each other, this generates the possibility of abuse. Some users may choose to verbally abuse other users, for instance. Rude or improper actions, such as sabotage or other improper game play may also occur, even in environments that are moderated or policed. In short, many computer-generated environments still remain susceptible to various undesirable aspects of human nature. In approach, an avatar's poor game performance (e.g., abnormally low rating or another objective performic metric) may be interpreted as abusive. In approach, any avatar performing poorly may be banned or restricted from playing the game. However, such approach may be overly broad as some players may legitimately be having a bad game without abusive intent.

Accordingly, to overcome the limited ability of computer-based environments to deal with undesirable aspects of human behavior, systems and methods are described herein for a computer-based process that detects improper behavior of avatars or other representations of users, and performs various actions upon these avatars accordingly, to carry out various functions such as preventing avatars from committing further bad acts, or marking such avatars so that other users may perceive them as bad actors. Users may then act accordingly, such as by avoiding contact or interaction with these bad actors.

In some embodiments of the disclosure, a computer system generating or monitoring a computer-based environment may monitor the behavior of avatars within the environment. In particular, the system may monitor verbal or text-based speech, as well as actions performed by avatars. If the system detects behavior it deems undesirable, such as behavior against any laws or rules of the environment, abusive or obscene language, and the like, avatars committing or associated with this behavior may be punished in some manner, such as by being marked in a way that is visually apparent to other users.

To accomplish this, computer systems may monitor the behavior of avatars in a computer-generated environment, generating and storing performance scores and behavior scores for each avatar that are based on their and game actions and behavior respectively. In some embodiments, these performance scores and behavior scores may act as baseline scores characterizing their typical behavior. When inappropriate behavior is detected by particular avatars, systems may monitor those avatars, and generate and store updated behavior scores tracking behavior subsequent to the detected inappropriate behavior. When performance changes, the performance score may be updated. The updated performance scores and behavior scores may be compared to the baseline scores, and when a sufficient negative difference exists between the two, the system may mark or otherwise act upon that particular avatar as being a bad actor. That is, if updated performance scores differ from baseline performance scores in a manner that indicates a significant rise in improper behavior as compared to an avatar's typical behavior, the system may punish or mark that avatar as a bad actor.

Inappropriate behavior may be detected in any suitable manner. As one example, avatar language, verbal and/or written, may be monitored, such as via natural language processing (NLP) methods that convert speech to text, as well as by methods and processes that detect abusive or otherwise improper language within text. As another example, avatar actions may be monitored to detect inappropriate interactions between that avatar and any other avatars. Inappropriate actions may be determined in any suitable manner, and may encompass any actions deemed unsuitable or undesired. For instance, avatars may be monitored for failure to perform a prescribed role. In this example, a system may determine a game character's class or abilities, to determine for instance that he or she is a class capable of healing or restoring life to other characters. Failure to do so when nearby characters are dead, dying, or suffering from loss of health may be considered inappropriate behavior if, for instance, such failures occur too frequently or occur for too long a period of time. Additionally, avatars may be monitored for other forms of inaction. Here, deliberate inaction may be harmful to the game play of other characters, e.g., one character taking no action may result in a group failing to beat a boss, accomplish a desired objective, or the like. As above, game play or behavior scores may be calculated, and if inaction results in a significant drop in score, or a drop that exceeds some predetermined threshold or exceeds a predetermined threshold for longer than a predetermined time period, an avatar may be punished, marked, etc., as a result of his or her inaction. Similarly, avatars may be monitored for change in behavior, with behavior being scored accordingly and significant negative change in behavior resulting in score change and thus marking or other punishment.

Punishments may be for a specified time, or may be reversed or undone when avatars exhibit good or remedial behavior. For example, avatars may be muted, demonetized, forbidden from certain areas of the computer-generated environment, banned, or the like for a specified period of time, whereupon these avatars may be fully reinstated and their punishment removed. When punishment involves marking, such markings may be removed when, for instance, undesired behavior is halted or corrected. Thus, for example, when avatar behavior scores return sufficiently close to baseline values, e.g., when the difference between current and baseline performance scores falls below some predetermined threshold, or falls below such threshold for longer than a predetermined time period, avatar markings may be removed. This provides incentive for users to correct their improper behavior.

Conversely, in some embodiments of the disclosure, punishments such as markings may be made permanent if, for example, avatar behavior is sufficiently egregious. Thus, for instance, if avatar performance scores fall from their baseline beyond a predetermined threshold, or fall from their baseline beyond a certain amount more than some predetermined number of times, avatars may be permanently banned, or markings may become permanent on that avatar, and impossible to remove even after subsequent good behavior.

Actions taken on avatars may be of any form. Embodiments of the disclosure thus encompass any action that may be taken upon an avatar, which may act to punish a user or deter him or her from any future undesirable behavior. Similarly, avatar markings may take any form. More specifically, avatar markings may be any change in any property of an avatar which is perceptible by others. That is, markings may alter any property of an avatar that is visible from within its computer-generated environment. For example, any one or more portions of an avatar may be altered in color. As another example, any graphical element may be applied to an avatar, e.g., a text-based sign, label, or the like. Markings may also include other forms of punishment, such as temporary or permanent bans, removal of the avatar from its computer-generated environment, or the like.

Additional techniques are provided for differentiating between abusive drops in performance as opposed to a user having a bad game or under-performing for another legitimate reason. In one approach, a system may establish a base line performance score (e.g., based on computed rating, rate of achieving games goals, etc.) for a certain avatar participating in a multiplayer game. When the system detects an inappropriate behavior event involving the avatar. For example, the system may detect a verbal argument (e.g., based on more loud voice communication) or use of inappropriate words. After the inappropriate behavior, the system monitors any changes in the performance score. If the performance score after the inappropriate behavior events decreases by more than a threshold amount, the system may determine that the performance score is motivating by the inappropriate behavior event and is thus likely abusive. The system may then take remedial actions (e.g., marking the avatar, banning the avatar). In this way, the system may punish abusive performance decreases without punishing users who simply have a bad (e.g., the system may not punish avatars for a simple decrease in performance score that is not associated with an inappropriate behavior event).

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which:

FIG. 12 conceptually illustrates breach data stored in accordance with embodiments of the disclosure.

DETAILED DESCRIPTION

In one embodiment, the disclosure relates to systems and methods for a computer-based process that detects improper behavior of avatars in a computer-generated environment, and marks these avatars accordingly, so that other users may perceive marked avatars as bad actors. Systems of embodiments of the disclosure may monitor avatar speech, text, and actions. If the system detects behavior it deems undesirable, such as behavior against any laws or rules of the environment, abusive or obscene language, and the like, avatars committing or associated with this behavior are marked in some manner that is visually apparent to other users. In this manner, improperly-behaving avatars may be more easily recognized and avoided, thus improving the experience of other users.

Figure 1:
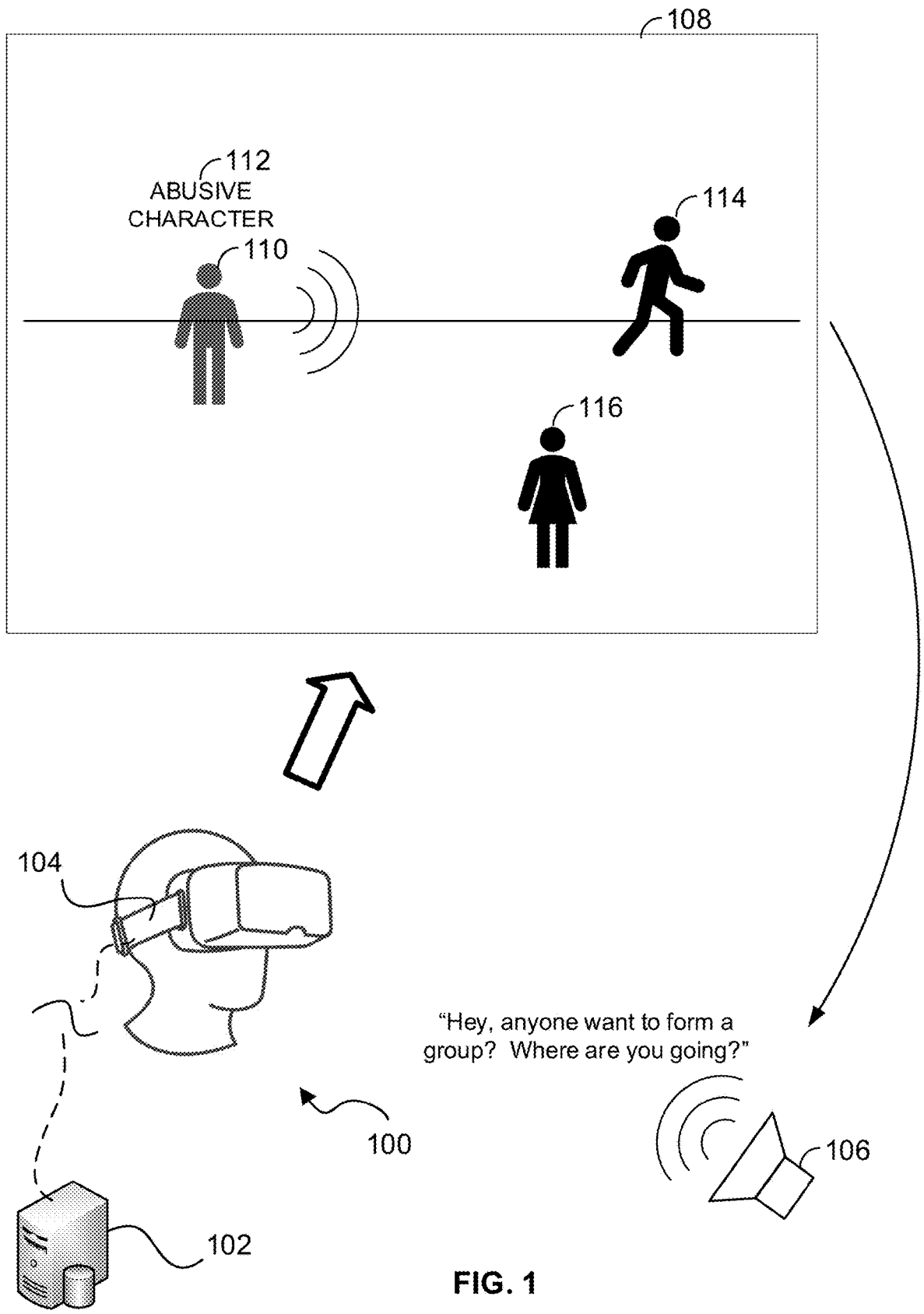
FIG. 1 conceptually illustrates operation of an exemplary system for behavior-based actions taken upon avatars in a computer-generated environment, in accordance with embodiments of the disclosure.

It is noted that embodiments of the disclosure may be implemented in any computer-generated environment. For example, embodiments of the disclosure may be employed in connection with avatars, i.e., any computer-generated representation of a user, of any at least partially virtual or computer-generated environment, including without limitation any fully virtual environment such as a video game or any other computer-based game environment, a virtual meeting, or any other computer-implemented platform that allows visual representations of users to interact with each other or with the environment of the platform. Embodiments of the disclosure may also be employed in connection with any extended reality environment, including any virtual reality (VR), augmented reality (AR), or mixed reality (MR) environment. VR systems immerse users in a fully digital or virtual environment, typically employing a headset or head-mounted display to present users with a 360-degree view of a completely virtual or simulated environment, sometimes referred to as a virtual world. In contrast, AR systems overlay virtual information and objects on a view of the physical world, also typically via a head-mounted display, to enhance the real world. Somewhat related to AR systems, MR or hybrid reality systems overlay virtual objects on a view of the real world, where users may interact with these virtual objects in similar manner to physical objects in the real world, e.g., by "touching" them to open them up, move them, or the like FIG. 1 conceptually illustrates operation of an exemplary system for behavior-based actions taken upon avatars in a computer-generated environment, in accordance with embodiments of the disclosure. Here, a content display system 100 includes a server 102 or other computer, in electronic communication with a head-mounted display 104. Server 102 generates one or more elements of a virtual environment and transmits these elements for display by head-mounted display 104 to the user. In particular, head-mounted display 104 projects images to generate a generally two- or three-dimensional environment 108 for immersing the user within. In particular, the user's view of environment 108 changes as the user moves his or her head, simulating the physical world. The environment 108 may include portions of the physical world, or may be a completely virtual environment, depending on whether the system 100 is a VR, MR, or AR system, or a gaming console, laptop computer, personal computer or the like that generates a virtual environment on its display. Each system 100 may also include a speaker 106 in electronic communication with its respective server 102 for transmitting sounds uttered by another user. In similar manner, each system 100 may include a microphone (not shown) in electronic communication with server 102 and configured for detecting and relaying user sounds to each other user. The microphone and/or speaker 106 may be incorporated into head-mounted display 104, or may alternatively be stand-alone devices positioned within audible range of head-mounted display 104.

The environment 108 may include one or more avatars 110, 114, 116, or representations of a user or participant in the environment. Avatars 110, 114, 116 may accordingly interact with each other within environment 108, such as by speaking to each other or by performing various actions within environment 108. Server 102 may monitor the speech and actions of each avatar 110, 114, 116 in environment 108. When server 102 detects avatar 110 speech and/or actions that are deemed sufficiently improper or undesirable, it imposes one or more actions upon avatar 110 to deter or punish such conduct. Any such actions are contemplated. In the example shown, avatar 110 has committed sufficiently bad acts of some type. Accordingly, server 102 marks avatar 110 as being an abusive actor, in a manner visible to other avatars 114, 116 within environment 108. Here, server 102 marks avatar 110 by changing its color, in this case by graying out avatar 110, or making avatar 110 partially transparent. Server 102 also places text above avatar 110, in this case the label "ABUSIVE CHARACTER," visibly indicating to other avatars 114, 116 that the avatar 110 has committed improper or undesirable actions. Avatars 114, 116 may then choose whether or not to interact with avatar 110, knowing that the avatar 110 may be deemed a bad actor. In the example shown, when avatar 110 verbally asks whether any other avatars wish to form a group (as projected over, e.g., speaker 106), avatar 114 declines and walks away. Avatar 116 may decide to interact, e.g., form a group, with avatar 110 despite being marked as an abusive character, or may also decide to decline interactions therewith.

Figure 2A:
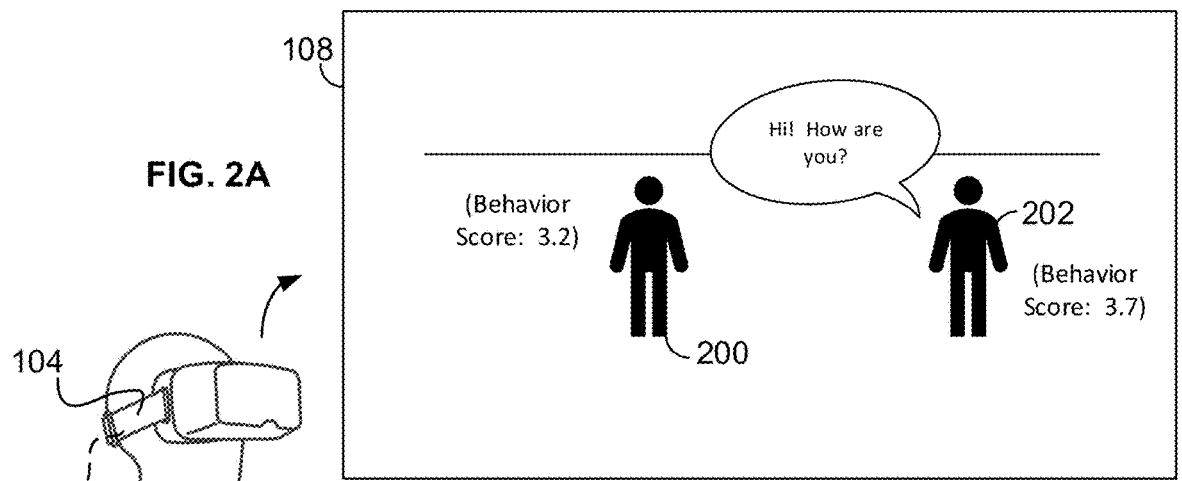
FIGS. 2A-2C conceptually illustrate further details of operation of an exemplary system for behavior-based marking of avatars in a computer-generated environment, in accordance with embodiments of the disclosure.
Figure 2B:
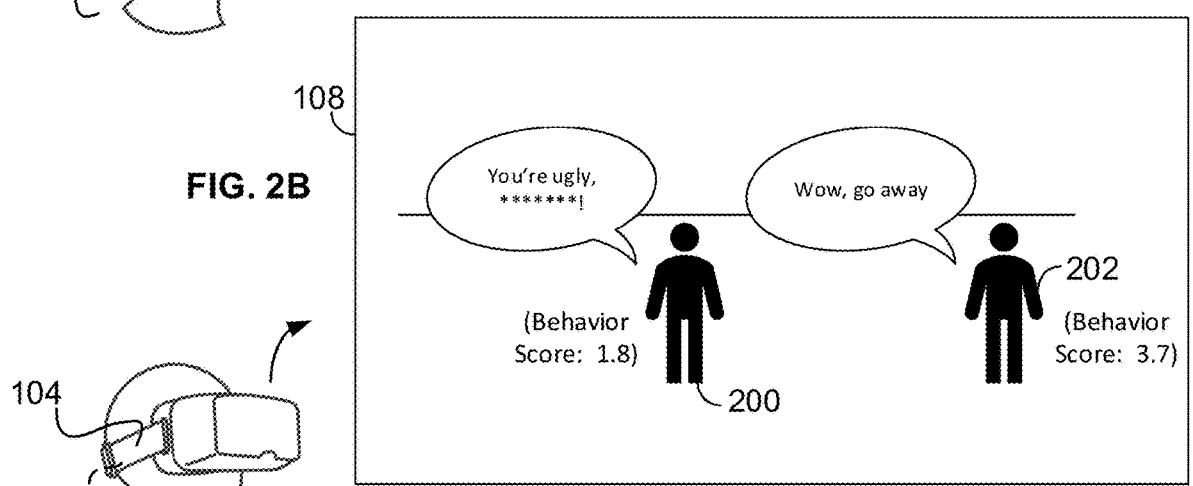
Figure 2C:
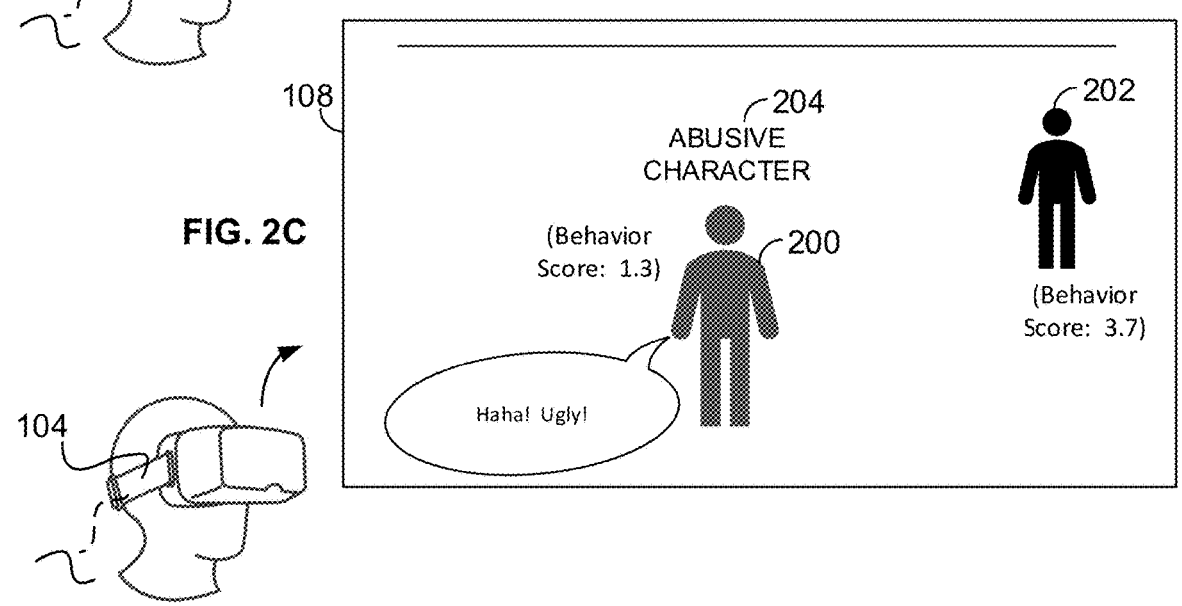

FIGS. 2A-2C conceptually illustrate further details of operation of an exemplary system for behavior-based marking of avatars in a computer-generated environment, in accordance with embodiments of the disclosure. More specifically, FIGS. 2A-2C illustrate a sequence of events in which an avatar 200 commits abusive acts, and is thereby visibly marked. As shown in FIG. 2A, avatar 200 has yet to interact with another avatar 202, who issues a cordial greeting. Accordingly, each avatar 200, 202 may have assigned thereto a behavior score representative of his or her past behavior. That is, server 102 may monitor the behavior of avatars 200, 202, and regularly assign scores thereto according to their behavior, such that behavior scores effectively reflect a running indication of the behavior of avatars 200, 202 within environment 108. Behavior scores may then be used to determine improper or undesired behavior, upon which server 102 can act accordingly. As an example, in FIG. 2A, avatars 200 and 202 have been assigned behavior scores of 3.2 and 3.7 respectively, reflecting their recent past behavior. Scores may be of any numerical value within any numerical range, and may be calculated in any manner to account for any behavior as desired. In the example shown, behavior scores may be within a range of 1.0-5.0, with lower scores reflecting worse detected behavior. In the example shown, avatar 200 (behavior score 3.2) has historically behaved slightly worse than avatar 202 (behavior score 3.7), although both have behaved within the range of what may be considered average or acceptable behavior. In this example, behavior scores may be calculated as, e.g., a number of beneficial tasks performed per unit of time, normalized to a 1.0-5.0 scale. For instance, its behavior score may be based on the amount of improper language used, the number of items or amount of currency given to other avatars per unit time, or the like, normalized to a 1.0-5.0 scale.

In FIG. 2B though, avatar 200 may direct unprovoked profane or insulting language at avatar 202 as shown, to which avatar 202 reacts negatively but not insultingly. Accordingly, server 102 detects the offensive or inappropriate language of avatar 200, and reduces its behavior score to 1.8 (e.g., each detected instance of offensive or inappropriate language may reduce behavior score by some predetermined amount, or the like). Server 102 does not detect any offensive or inappropriate language from avatar 202, and thus leaves its behavior score unchanged at 3.7.

In FIG. 2C, avatar 200 continues its abusive behavior, continuing to direct verbal insults at avatar 202, while avatar 202 does not engage in any offensive or inappropriate actions in return, electing simply to walk away. Server 102 detects these actions and accordingly continues to reduce the behavior score of avatar 200 to 1.3, while the behavior score of avatar 202 remains unchanged at 3.7. In some embodiments of the disclosure, other values may be assigned to the actions of avatars, and/or avatar 202 may be rewarded for his refusal to engage negatively, perhaps with an increased behavior score.

As the behavior score of avatar 200 has fallen to 1.3 (e.g., above a threshold difference from historical score 3.2 and thus indicating excessive inappropriate or undesired behavior, where this threshold value may be any suitable value), server 102 performs an action upon avatar 200, to punish avatar 200 and/or reduce any risk to other avatars. In this example, server 102 marks avatar 200 as an abusive character by changing its color, and applying a text-based "ABUSIVE CHARACTER" banner 204 above avatar 200. Other avatars such as avatar 202 may then visually recognize that avatar 200 has exhibited excessive undesirable behavior recently, and may choose to avoid interacting with avatar 200, thus improving their experience within environment 108. As further described below, server 102 may continue to monitor the behavior of avatars 200, 202, and in some embodiments may remove the markings on avatar 200 upon sufficient subsequent good behavior. Conversely, if avatar 200 exhibits further improper or undesired behavior, server 102 may enact further actions, such as making the color change and banner 204 permanent, banning avatar 200 or otherwise removing it from environment 108, or the like.

Figure 2D:
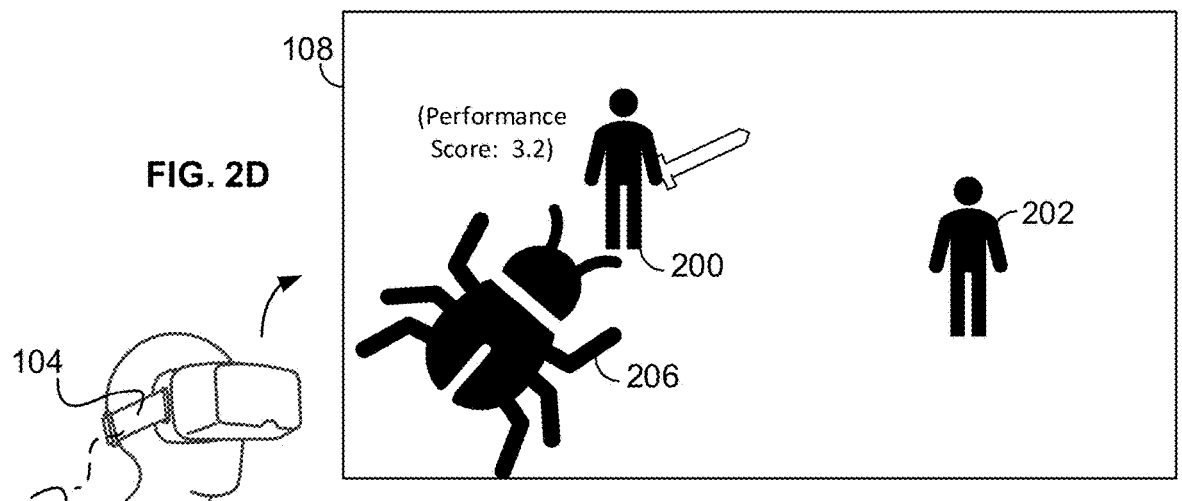
FIGS. 2D-2F conceptually illustrate further details of operation of another exemplary system for behavior-based marking of avatars in a computer-generated environment, in accordance with embodiments of the disclosure.
Figure 2E:
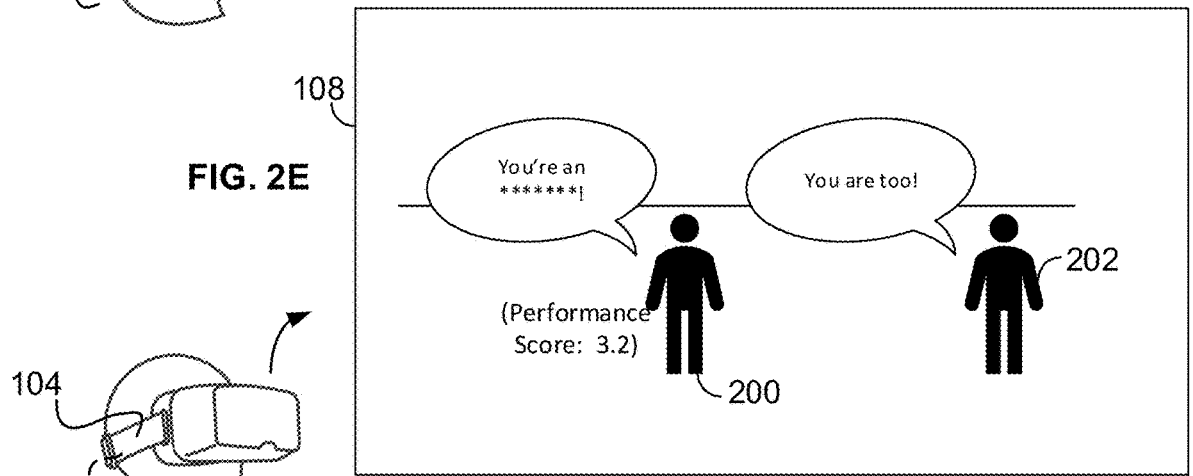
Figure 2F:
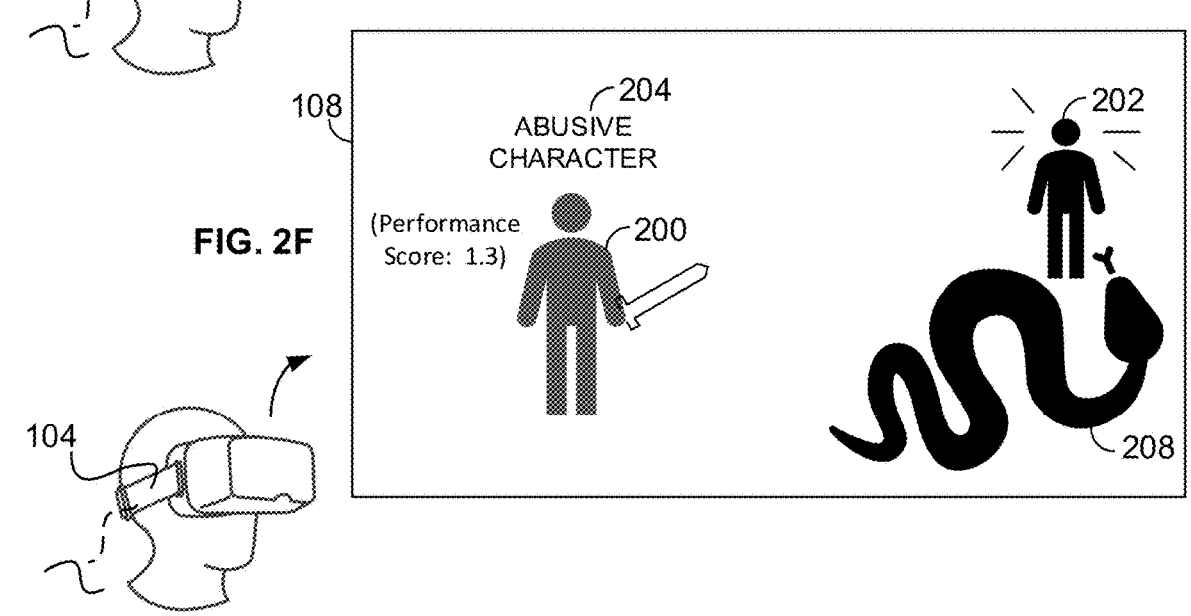

FIGS. 2A-2C illustrate marking when abusive behavior is detected. However, embodiments of the disclosure contemplate marking in any situation that may be deemed warranted. For example, in some embodiments, marking may occur upon an undesired drop in performance, such as an undesired drop in performance, sabotage, or other undesirable behavior that occurs after an event like a dispute. That is, embodiments of the disclosure may wish to mark avatars as abusive if they reduce their performance after a dispute. This may be indicative of, for instance, a player that performs undesired actions on, or allows undesired actions to occur on, another character after he or she has a dispute with that character. FIGS. 2D-2F conceptually illustrate further details of operation of another exemplary system for behavior-based marking of avatars in a computer-generated environment, in accordance with embodiments of the disclosure. In FIG. 2D, avatar 200 begins with a historic performance score of 3.2, which may be based on avatar 200 performance within environment 108, such as how well avatar 200 performs its designated role. As an example, when environment 108 is an action-oriented game and avatar 200 belongs to a fighting class, the performance score of avatar 200 may be calculated at least in part according to the number of battles avatar 200 engages in per unit of time, with a greater average number of battles leading to a higher score. As another example, when avatar 200 belongs to a healing class, performance scores may be calculated according to the number of heals performed on other avatars, per unit of time. Performance scores may be calculated in any suitable manner, to measure any desired behavior(s) of an avatar over time. As shown in FIG. 2D, avatar 200 may battle a hostile element 206 of environment 108, such as to maintain his or her performance score, to protect another avatar 202, or simply because that is the desired behavior for avatars of that particular class. Accordingly, battling hostile element 206 may maintain or increase the performance score of avatar 200, such as by numerically increasing the average battles per hour, or the like.

In FIG. 2E, avatar 200 then engages in improper or undesired behavior by getting into a dispute with avatar 202, where disputes may be detected as below, via detected language, audio volume, speech (words indicative of conflict), or the like. While the performance score of avatar 200 does not change during the dispute (unless the dispute lasts so long that it begins to reduce the average battles per unit time of avatar 200, etc.), remaining at 3.2, the dispute may be detected by server 102, such as by methods and processes for detecting undesired or improper behavior as further described below.

In FIG. 2F, after the dispute of FIG. 2E is detected, avatar 200 may refuse to perform its expected roles in protest over the dispute. As shown, avatar 200 may refuse to battle hostile element 208 as he or she ordinarily would, instead allowing hostile element 208 to attack avatar 202. This dereliction of its duties may reduce the performance score of avatar 200 to, e.g., 1.3, as avatar 200 is no longer battling hostile elements as he or she is expected to. Accordingly, server 102 detects a drop in performance score after a detected dispute, a behavior pattern which is determined to be improper or undesired. Server 102 thus marks avatar 200 as an abusive character by changing its color, and applying a text-based "ABUSIVE CHARACTER" banner 204 above avatar 200. Avatar 202, if he or she survives, may thus avoid avatar 200 in the future. Server 102 may mark and unmark in any manner, at any interval, as suitable. For example, server 102 may allow a grace period before marking. That is, server 102 may allot a certain amount of time after a performance score threshold is breached before marking, to allow the breaching avatar to remedy its performance, allow for correction of simple errors, or the like. Similarly, server 102 may alter the performance score threshold, or amount of time after a performance score threshold is breached before marking, for either one or both parties to a dispute, to allow for a cooling off period and give each avatar a chance to recover.

Figure 3:
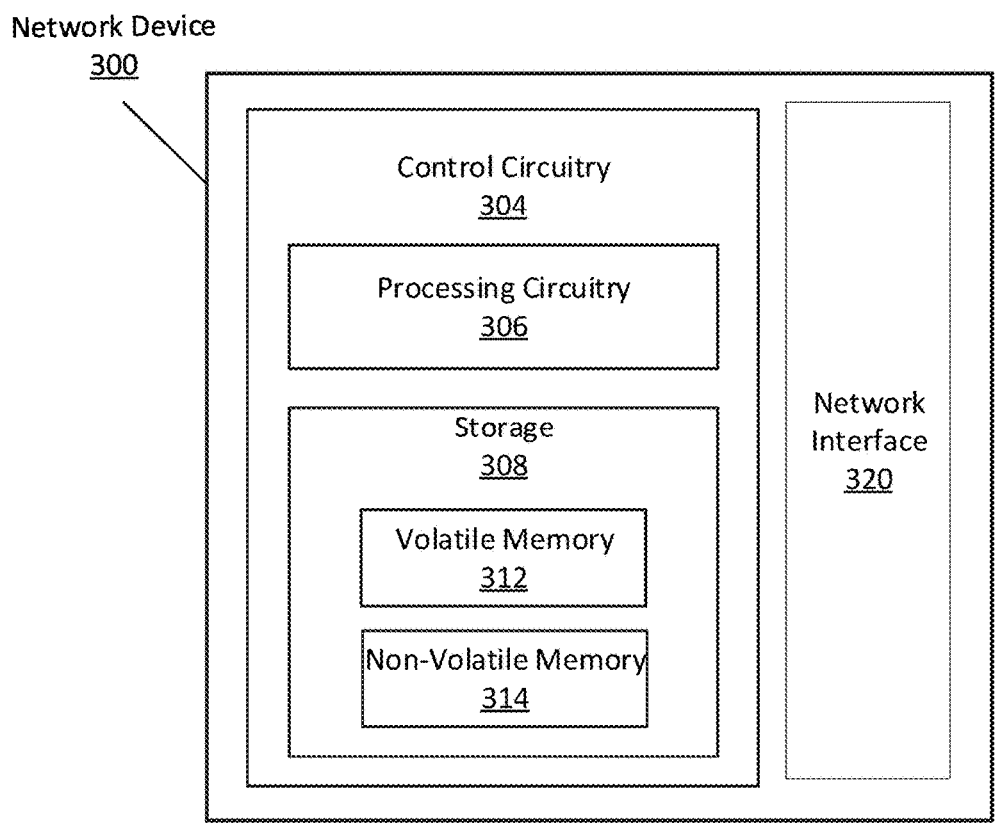
FIG. 3 is a block diagram of an illustrative device in a system for behavior-based actions taken upon avatars in a computer-generated environment, in accordance with embodiments of the disclosure.

FIG. 3 shows an illustrative block diagram of a device 300 in an extended reality system, according to some embodiments of the disclosure. Device 300 in an extended reality system may include one or more servers (e.g., server 102 of FIG. 1) for generating, displaying, and/or managing an extended reality environment, including monitoring behavior of and performing resulting actions on avatars, which is transmitted over a computer network to end-user multi-perspective devices (e.g., devices 104 of FIGS. 1 and 2A-C). Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer.

In some embodiments, processing circuitry 306 may be distributed across multiple separate processors or processing units, for example, multiple of the same type of processing units (e.g., two Intel Core i7 processors) or multiple different processors (e.g., an Intel Core i5 processor and an Intel Core i7 processor). A network interface 320 may be used to communicate with other devices in a network system (e.g., between devices 104 and across internet 410 of FIG. 4).

In some embodiments, control circuitry 304 executes instructions for execution of extended reality content generation and/or processing functions stored in memory (i.e., storage 308). The instructions may be stored in either a non-volatile memory 314 and/or a volatile memory 312 and loaded into processing circuitry 306 at the time of execution. A system for generating and processing extended reality content (e.g., the systems described in reference to FIGS. 1-2C) may be a stand-alone application implemented on a user device (e.g., end-user device 104) and/or a server (e.g., server 102) or distributed across multiple devices in accordance with device 300. The system may be implemented as software or a set of executable instructions. The instructions for performing any of the embodiments discussed herein of extended reality processing may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, instructions in accordance with the processes described herein may be stored in storage 308, and executed by control circuitry 304 of device 300.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 304 may also include scaler circuitry for upconverting and downconverting content into the preferred output format of the end-user devices 104. Circuitry 304 may also include digital-to-analog converter circuitry and analog-to-digital converter circuitry for converting between digital and analog signals. The tuning and encoding circuitry may be used to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, functions for incorporating video or other recordings of physical environments, multiple-tuner recording, etc.). If storage 308 is provided as a separate device from device 300, the tuning and encoding circuitry (including multiple tuners) may be associated with storage 308. Device 300 may be a central device in communication with each device 104. Alternatively, device 300 may correspond to device 104, that is, each system 100 may not have its own device 104, but rather a single central device 300 may carry out extended reality environment generation and audio conflict resolution processes for every system 100.

Figure 4:
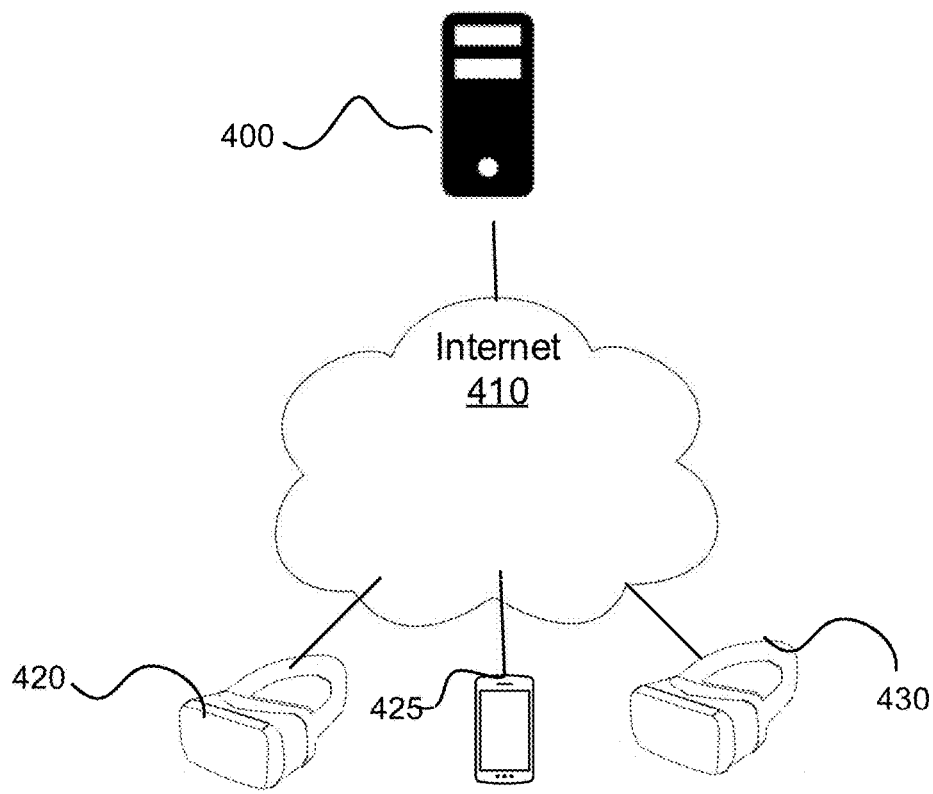
FIG. 4 is a block diagram of an illustrative system for behavior-based actions taken upon avatars in a computer-generated environment, in accordance with embodiments of the disclosure.

FIG. 4 shows an illustrative block diagram of an extended reality content system according to some embodiments of the disclosure. At least one extended reality content server 400 generates extended reality content, such as that described herein. Extended reality content server 400 transmits the content over internet 410 to multiple end-user devices including devices 420, 425, 430. End-user extended reality devices may include, for example, personal computers, mobile devices (e.g., smart phones), and/or wearable devices including extended reality headsets, goggles, suits, gloves, etc., configured to present and allow interaction with extended reality environments. These devices are configured to allow an operator/user to view and interact with multi-user extended reality content. These devices may provide, for example, visual, audio, and haptic feedback that present the perspectives and attention-directing cues such as described herein. End-user devices 420, 425, 430 also transmit data to server 400 via internet 410, where such data includes orientation information indicating the direction the devices 420, 425, 430 are facing (and thus the view that server 400 must generate for display on each device 420, 425, 430), audio signals detected by each device 420, 425, 430, and user input such as selections of extended reality objects. Server 400 then generates a view of the extended reality environment for each device 420, 425, 430.

Figure 5:
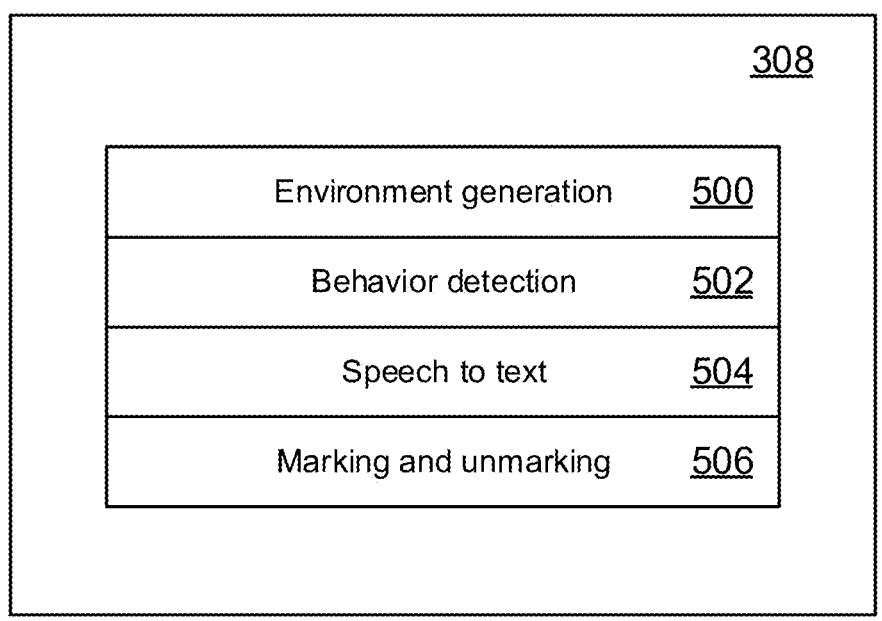
FIG. 5 is a block diagram of instruction modules stored in the storage of the device of FIG. 3, in accordance with embodiments of the disclosure.

FIG. 5 is a block diagram of instruction modules stored in the storage of the device of FIG. 3, in accordance with embodiments of the disclosure. The instructions stored in storage 308 may include any number of instruction or code modules for executing processes of embodiments of the disclosure. In some embodiments, the instruction modules include an environment generation module 500 for generating the extended reality environment transmitted to and displayed by each device 420, 425, 430, as well as a behavior detection module 502 for determining behavior of avatars and generating corresponding behavior scores. The instruction modules also include a speech to text module 504 for transcribing audio signals from users of the environment, as well as a marking and unmarking module 506 for marking and unmarking avatars and/or imposing other actions thereupon.

Figure 6:
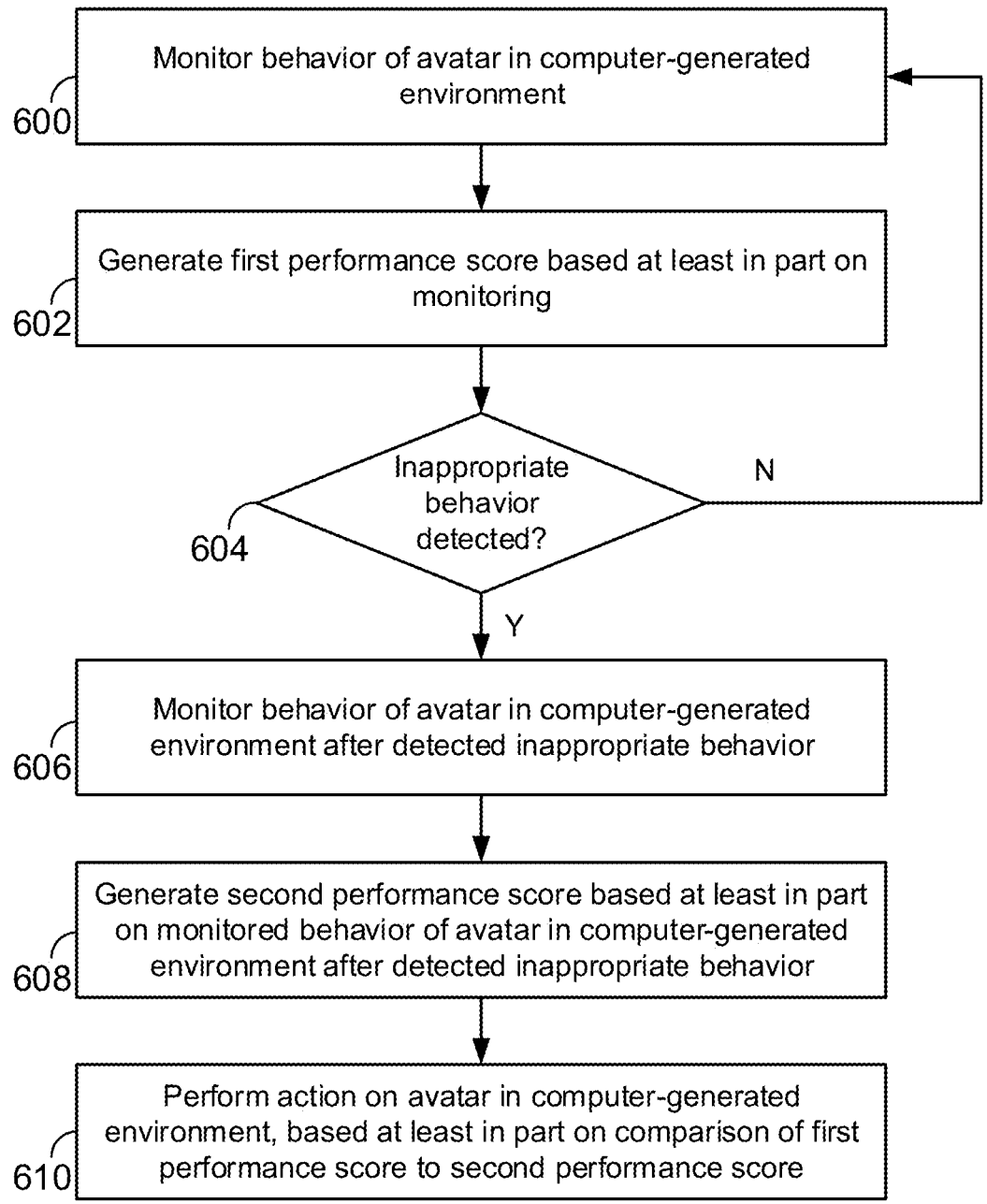
FIG. 6 is an illustrative flowchart of a process for behavior-based actions taken upon avatars in a computer-generated environment, in accordance with embodiments of the disclosure.

FIG. 6 is an illustrative flowchart of a process for behavior-based actions taken upon avatars in a computer-generated environment, in accordance with embodiments of the disclosure. In some embodiments, the process begins with server 102 monitoring the behavior of avatars within their computer-generated environment (Step 600). In particular, the server 102 may monitor both the speech and actions and gameplay of each avatar. As further described below, server 102 may for example transcribe the speech of each avatar, e.g., the speech uttered by each user of an avatar, and detect offensive or inappropriate words or phrases. In addition, server 102 may monitor the actions of each avatar to detect offensive or inappropriate actions, and/or actions that are expected to be carried out, or lack thereof.

Server 102 generates a performance score which is based at least in part on the monitoring of Step 600 (Step 602). In some embodiments of the disclosure, behavior detection module 502 and speech to text module 504 monitor avatar performance, to detect behaviors that contribute to avatar performance scores such as battles, heals, or other actions expected to be taken. In some embodiments, speech may be monitored and scored as described further below in connection with FIG. 7, while avatar behavior or actions may be monitored and scored as described further below in connection with FIG. 8. In some embodiments of the disclosure, speech may be monitored by transcription to text, which then may be parsed to detect offensive or inappropriate words or phrases. In some embodiments of the disclosure, behavior may be monitored by tracking of avatar actions, such as battles, heals, or the like. Any suitable tracking of any actions of any one or more avatars is contemplated.

Further, performance scores may be based on any actions, and calculated in any desired manner. As one example, frequency of expected actions carried out may be reflected in performance score as above, such as the number of battles carried out per unit of time, or the like. As another example, some actions may be deemed as foul play, and may thus contribute to lowered behavior scores. Foul play may take on any number of forms. One form may be failing to perform a prescribed role. Here, avatars may be designated for performance of certain roles, and failure to perform these roles may be detected and result in score reduction. For example, a user may be selected or designated to give a presentation or submit content. Behavior detection module 502 may detect that the user or his or her avatar, account, or representation is designated to perform an action or submit content, such as by detection of a flag or field in the user's account or profile which may be set by, e.g., a meeting or call leader or moderator. Thus, behavior detection module 502 may detect the flag or field value, and detect that no content has been submitted, the speaker has not spoken a sufficient volume of words, or the like, by the deadline, and reduce the speaker's behavior score accordingly. Similarly, an avatar in a computer-generated environment such as a game environment may be designated as belonging to a particular class, such as a healing class whose primary role is healing other players or avatars. For instance, the avatar has its behavior score reduced if it fails to perform its healing function when it is expected to. For example, behavior detection module 502 may detect that a healing avatar is in a group and the group is engaged in a conflict, such as by whether one or more group members is damaged or injured, one or more non player characters is attacking any group member, or the like. In this case, behavior detection module 502 may monitor the number of heals performed by the avatar while the group is engaged in a conflict, and reduce the avatar's behavior score when the number of heals performed is insufficient. Score reduction may be performed in any manner, e.g., behavior detection module 502 may reduce the avatar's score when the number of heals per unit of time falls below a predetermined threshold, another group member's health falls below a predetermined amount for greater than some predetermined amount of time or for more than a predetermined number of times, other group members are not resurrected or revived for greater than some number of times, another group member who is designated as a main attacker or the like falls too low in health or dies too often, other group members die too often, or the like. Conversely, behavior detection module 502 may increase a healing avatar's score if it performs its healing function well, e.g., keeps the health of other group members above some threshold, the group experiences few deaths while engaged in conflict, or the like.

Another form of foul play may be deliberate inaction or lack of play. In some embodiments of the disclosure, behavior detection module 502 may monitor avatars for lack of participation. For example, behavior detection module 502 may determine that a participant in a call, meeting, or other interactive group has not spoken enough, has his or her camera off for too long, has not logged in or joined the call or meeting, or the like, and reduce his or her score accordingly. Similarly, in the game context, behavior detection module 502 may monitor avatars for lack of participation in a group or lack of interactions. As one example, behavior detection module 502 may monitor the environment for network speed and any downtime, as well as avatar idle time (e.g., time when an avatar is still and inactive, lack of keystrokes or other input, or the like). When the network is up and running, yet the avatar is idle for greater than some predetermined amount of time, the avatar may be deemed to be failing to play or participate when it is supposed to, and its behavior score may be reduced. Similarly, behavior detection module 502 may determine the amount of time when an avatar cannot play or participate, e.g., the sum of network downtime and avatar-designated away from keyboard (AFK) time, and a significant difference between an avatar's idle time and the amount of time when an avatar cannot play or participate may indicate excessive failure to play or participate, with corresponding behavior score reduction imposed.

A further form of foul play may be drop in performance or refusal to participate after an altercation or other form of conflict. For example, after an argument with another player, an avatar may alter its game play in a negative manner, such as by attempting to attack that player, not healing that player, or the like. More specifically, behavior detection module 502 may detect an altercation or dispute between players in any manner, such as by detecting certain words or phrases within their spoken words, detecting raised volume levels, machine learning-based methods of detecting events such as arguments or the emotional state of participants, or in any other suitable manner. Once an altercation or dispute is detected, the game play of altercation participants is monitored such as via a performance score as above, and significant differences in performance score after the detected dispute may indicate foul play. For example, if one altercation participant is a healing class, previously healed the other altercation participant regularly prior to the altercation, and fails to heal the altercation participant after the altercation, the behavior or performance score of that avatar may be reduced. As another example, average or historic behavior, such as the average rate at which beneficial effects are projected onto other players is determined, and a significant reduction in beneficial effects directed at the altercation participant as compared to the historic average may be deemed foul play. Any change or drop in performance may be monitored for, and deemed foul play when detected.

A further form of foul play may be a change or reduction in environment input patterns. For example, an avatar may commonly enter particular keyboard or mouse input patterns in a game environment, such as repeatedly performing certain beneficial tasks, and behavior detection module 502 may determine a historical pattern or rate at which a user enters these input patterns, achieves certain objectives, or the like. For example, a significant reduction in the number of times an avatar gathers some beneficial resource for a group, attacks aggressors, performs some beneficial function in a group setting, or the like may be deemed foul play.

In some embodiments, behavior-based determinations of foul play may be determined according to a comparison to predetermined threshold values. In some other embodiments, behavior-based determinations of foul play may be determined according to a comparison to historic or prior average behaviors. That is, behavior detection module 502 may determine the historic average rate or value at which an avatar performs certain actions, with a behavior score reduction based on deviation from this average. Accordingly, behavior detection module 502 may continuously log occurrences of any action or event, calculate running or any other averages of such occurrences, and store these average values such as in storage 308, for comparison to other actions or events detected in substantial real time.

In the above manner, behavior detection module 502 may constantly monitor the speech and actions of avatars for anything it may deem to be inappropriate behavior (Step 604). In some embodiments, behavior detection module 502 may monitor for disputes, conflicts, or the like. If no inappropriate behavior is detected, the process may return to Step 600, where module 502 continues to monitor avatar behavior. On the other hand, when module 502 determines that inappropriate or undesirable behavior has occurred, module 502 may log the inappropriate behavior and continue to monitor the behavior of that avatar in the computer-generated environment (Step 606), generating new behavior or performance scores based on post-inappropriate behavior performance (Step 608). That is, performance scores capturing actions prior to detected inappropriate behavior, e.g., historically generated scores or simply scores generated prior to the inappropriate behavior, are generated along with performance scores capturing actions after the inappropriate behavior. Behavior detection module 502 may then determine whether to perform an action upon avatars, based on a comparison of the pre-inappropriate behavior scores to the post-inappropriate behavior scores (Step 610). Scores may be determined according to avatar actions and/or speech, as above. In this manner, metrics characterizing avatar behavior, both recent and average over time, may be continuously determined. Significant deviation from historic averages of any one or more desired metrics may then be indicative of inappropriate or undesired behavior that may be acted upon.

Figure 7:
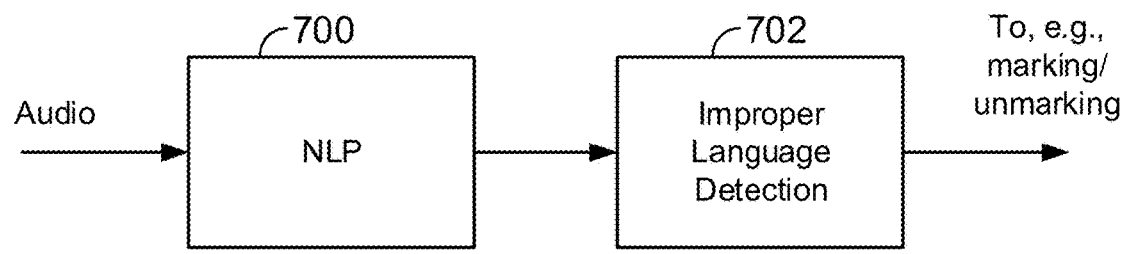
FIG. 7 is a block diagram representation of a system for detecting inappropriate or undesired avatar language, in accordance with embodiments of the disclosure.

FIG. 7 is a block diagram representation of a system for detecting inappropriate or undesired avatar language, in accordance with embodiments of the disclosure. As described above, systems of embodiments of the disclosure may monitor avatar speech for offensive or otherwise undesired speech, and behavior scores may be modified accordingly. More specifically, speech to text module 504 may include an NLP module 700 and an improper language detection module 702. The NLP module 700 receives audio signals from, or associated with, environment participants such as avatars, and transcribes speech from the audio signals to text. Such NLP modules are known and may operate to convert speech from audio signals to text in any manner, such as by one or more machine learning models trained to recognize spoken words and generate corresponding text as output. The output text is transmitted to improper language detection module 702, which determines whether the text output from NLP module 700 represents words or phrases that are deemed improper and thus should affect a behavior score. Any words or phrases may be deemed improper, as desired in various embodiments of the disclosure.

Improper language detection module 702 may detect improper language in any manner. In some embodiments of the disclosure, module 702 may store a list or other set of words or phrases deemed improper, and compare text output from NLP module 700 to this stored list. When text output from NLP module 700 matches any words or phrases of this list, module 702 may transmit a signal to, e.g., marking and unmarking module 506 or another module of server 102, indicating that an improper word or phrase was detected, along with other information that may be desired, such as the identity of the speaker, a date/time stamp at which the improper word or phrase was detected, or the like. Marking and unmarking module 506 or another module of server 102 may then adjust behavior scores of the speaker accordingly. Improper language may also be detected in any other manner, such as by machine learning-based methods of detecting events such as arguments or the emotional state of participants coupled with detection of certain altercation-related words, raised volume levels, or any other inputs that may be indicative of conflicts.

Figure 8:
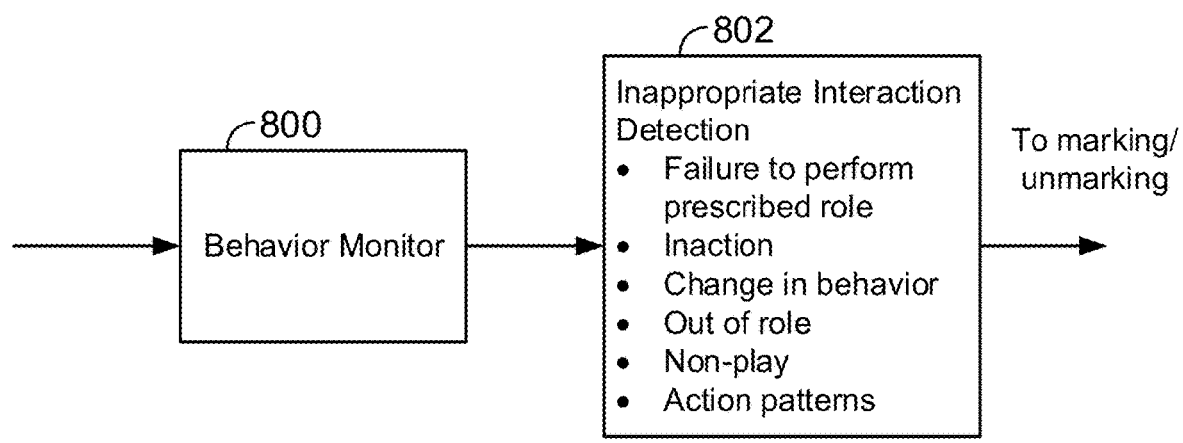
FIG. 8 is a block diagram representation of a system for detecting inappropriate or undesired avatar interactions, in accordance with embodiments of the disclosure.

FIG. 8 is a block diagram representation of a system for detecting inappropriate or undesired avatar interactions, in accordance with embodiments of the disclosure. As described above, systems of embodiments of the disclosure may monitor avatar speech for offensive or otherwise undesired actions, and behavior scores may be modified accordingly. More specifically, behavior monitor 800 may monitor the behavior of participants in its computer-generated environment by determining and logging participant actions as they occur. Actions may be determined in any manner. As one example, meeting participant actions may be monitored for actions such as when and for how long participants speak, documents that are uploaded, text that is entered, or the like. As another example, game participants may be monitored for any actions, such as attacking, using a weapon, inflicting damage, casting a spell or using an ability, making any particular gesture, or the like, as well as location within the computer-generated environment, and avatar states such as running, jumping, and the like. Determined actions may then be submitted to inappropriate interaction detection module 802, which may determine whether any of the detected actions constitutes any of the above described or other improper or undesired behaviors. More specifically, module 802 may compare the determined actions to a stored set of predefined actions or action patterns such as those described above, to determine matches. When a match is detected between avatar actions and any stored actions or action patterns, module 802 may transmit a signal to, e.g., marking and unmarking module 506 or another module of server 102, indicating that an improper action was detected, along with other information that may be desired, such as the identity of the actor, a date/time stamp at which the improper action was detected, or the like. Marking and unmarking module 506 or another module of server 102 may then adjust behavior scores of the speaker accordingly.

As above, actions may be taken against avatars or other participants when their performance scores fall below some threshold amount, or differ significantly from their historic averages. Embodiments of the disclosure contemplate any actions taken, such as marking of an avatar in any way, e.g., changing any aspect of its appearance, application of a sign or other text warning to other participants, and the like. Other actions besides markings are contemplated, such as demonetization, removal of the avatar from its group, banning, suspension, forced logging off for some time, reduction in abilities or attributes, removal of items, or the like.

Server 102 may perform remedial actions such as reversing or removing some actions taken against avatars, based on subsequent avatar behavior. That is, avatars that are marked for inappropriate behavior may have their markings removed if they behave appropriately for at least some amount of time. conversely, avatars that do not correct their behavior, or continue to behave inappropriately, may remain marked.

Figure 9:
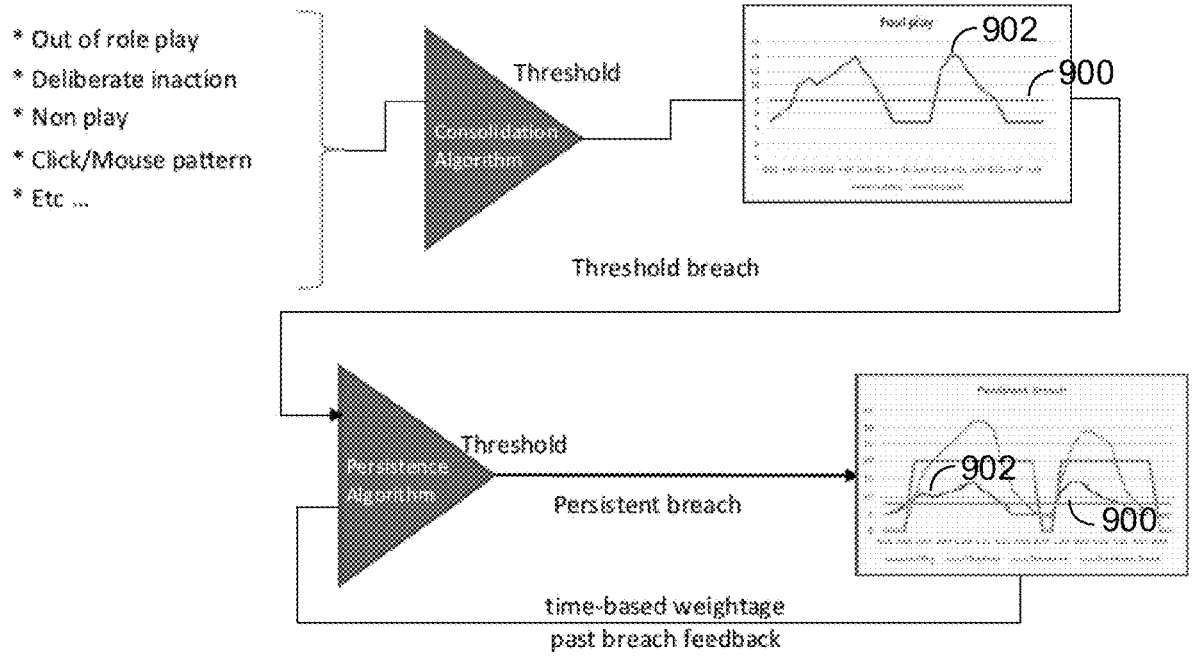
FIGS. 9-11 are diagrams illustrating decision processes for actions taken on avatars, in accordance with embodiments of the disclosure.

FIG. 9 illustrates an example in which an avatar corrects its behavior but then commits subsequent inappropriate behavior, thus remaining marked. In some embodiments of the disclosure, behavior scores may be compared to a threshold score value, and marking or other action may be taken after a certain number of breaches, or instances in which an avatar's foul play rises above the threshold. Marking may be removed if, for example, behavior score subsequently falls below the threshold for greater than some amount of time. However, if the behavior score once again rises above the threshold within this amount of time, marking is not removed. As shown in FIG. 9, an avatar's behavior score 902 indicates the amount of foul play committed, with higher values indicating worse or greater foul play. This behavior score 902 may be compared to a threshold value 900 over time. When the score 902 rises above threshold value 900 for greater than some specified period of time, as shown in the left of the upper graph of FIG. 9, the avatar may be marked as being, e.g., an abusive character. This marking may be removed upon subsequent good behavior. Indeed, after marking, the avatar's score 902 falls below the threshold 900. However, the score 902 soon rises above threshold 900 once again, as shown in the center right of the upper graph of FIG. 9. That is, once a breach occurs, server 102 may then monitor to determine whether this breach is persistent, i.e., occurs repeatedly or continuously, with persistent breach indicating continued marking. Here, as breach occurs again within a relatively short period of time, the avatar is considered to be in persistent breach, and its marking is maintained. The period of time used to determine persistent breach may be a fixed or predetermined time period, or may vary depending on any factors. In the example shown, the persistent breach time period may be determined according to factors such as past breach history or weighting of behaviors (with, for example, very good subsequent behavior reducing the persistent breach time period, etc.), as shown.

Figure 10:
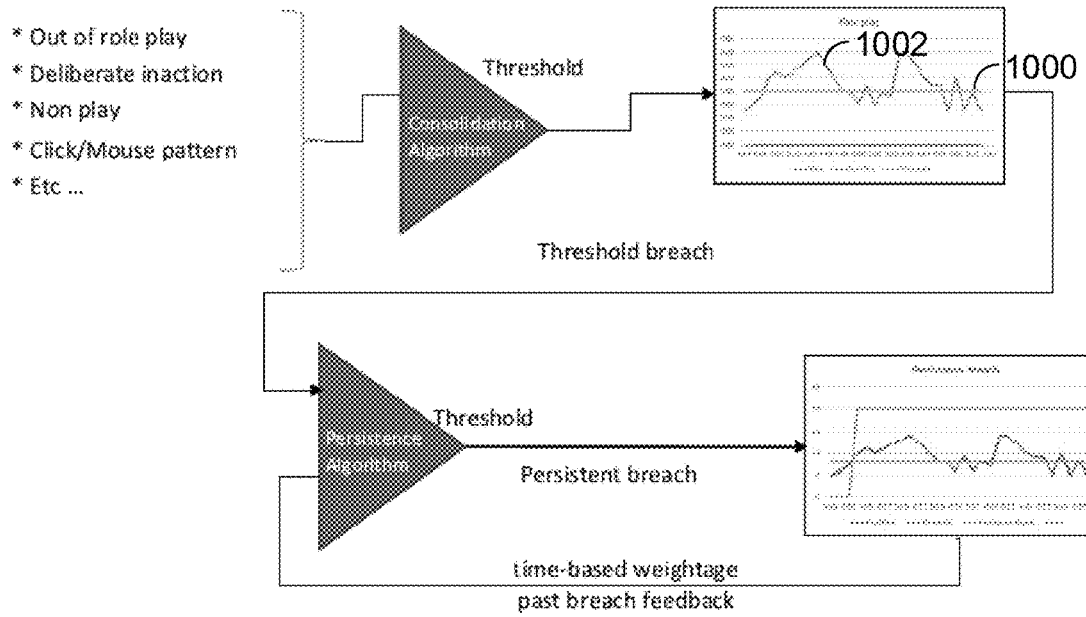

FIG. 10 illustrates an example in which an avatar fails to correct its behavior, thus remaining marked or otherwise punished. Here, behavior score 1002 rises above threshold value 1000, never falling below the threshold 1000 for long, as shown in the upper graph of FIG. 10. That is, in some embodiments of the disclosure, greater than a predetermined number of breaches within a specified time period may result in marking. While behavior improves for a short while, repeated breaches once again occur soon thereafter, as shown in the right most portion of the upper graph of FIG. 10. Marking is thus maintained. That is, in some embodiments of the disclosure, greater than a predetermined number of breaches within the period of time used to determine persistent breach may result in marking being maintained. As above, the period of time used to determine persistent breach may be a fixed or predetermined time period, or may vary depending on any factors. In the example shown, the persistent breach time period may be determined according to factors such as past breach history or weighting of behaviors.

Figure 11:
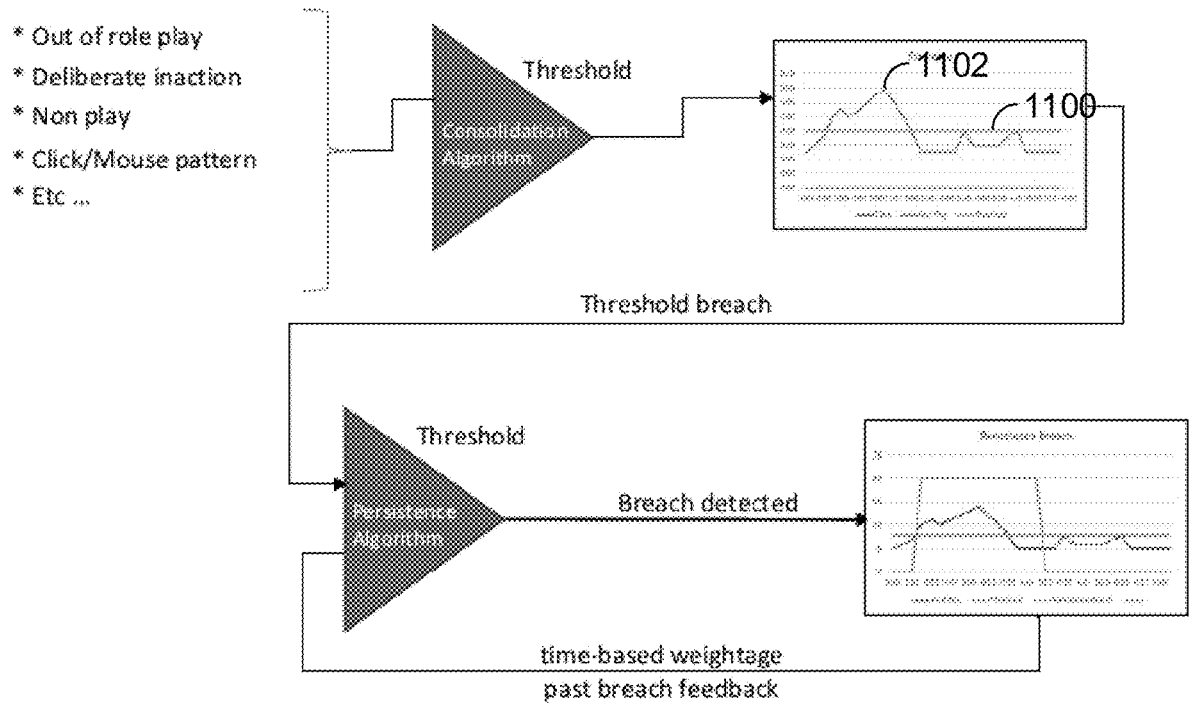

FIG. 11 illustrates an example in which an avatar corrects its behavior and remains within the threshold limit for greater than the period of time used to determine persistent breach. In this example, markings are removed from the avatar. Here, behavior score 1102 rises above the threshold value 1100 at the left side of the upper graph of FIG. 11, resulting in marking. The behavior score 1102 then falls back below threshold 1100 and subsequently approaches but does not exceed threshold 1100 again. Breach is thus considered not persistent, and marking is removed.

In some embodiments of the disclosure, breach data may be stored for use in determining historic or average behavior scores, or the like. Breach data may be stored, for example, in storage 308, or any other suitable memory. In addition to determination of average or historic scores, breach data may be stored for any other purpose, such as use in determining persistent breach, actions taken, and the like. As an example, stored breach data may include the actions that led to breach, their number and frequency, behavior score values, etc., any of which may be later retrieved to serve as a factor in determining actions taken on avatars. For instance, once an avatar has committed a breach, marking and unmarking module 506 may retrieve that avatar's stored breach data from storage 308, to determine whether and/or how many past breaches have occurred, when they have occurred, and the like. When the latest breach is one of many past breaches the avatar has committed, server 102 may take more severe action, such as suspending or banning the avatar's account, demonetizing the avatar's account, or the like. On the other hand, if the latest breach is the first ever for that avatar, or is the first committed in a significant amount of time, server 102 may take less severe action, such as a text- or voice-based warning issued to the avatar, marking for a short period of time, or the like.

FIG. 12 illustrates exemplary breach data that may be stored in accordance with some embodiments of the disclosure. Any breach data may be stored at any time or frequency, for any avatar or user of a computer-generated environment. In the example shown, when a breach occurs, the type of action that led to the breach may be stored (e.g., <inaction, non-play>), along with other parameters such as an identification of the avatar or account ProfileID, a level which may be a severity level (determined in any suitable manner, according to any criteria) or an indicator of the number, extent, or severity of breaches, the threshold that was breached, and/or any other information desired. This breach data may be subsequently retrieved as desired.

Figure 13:
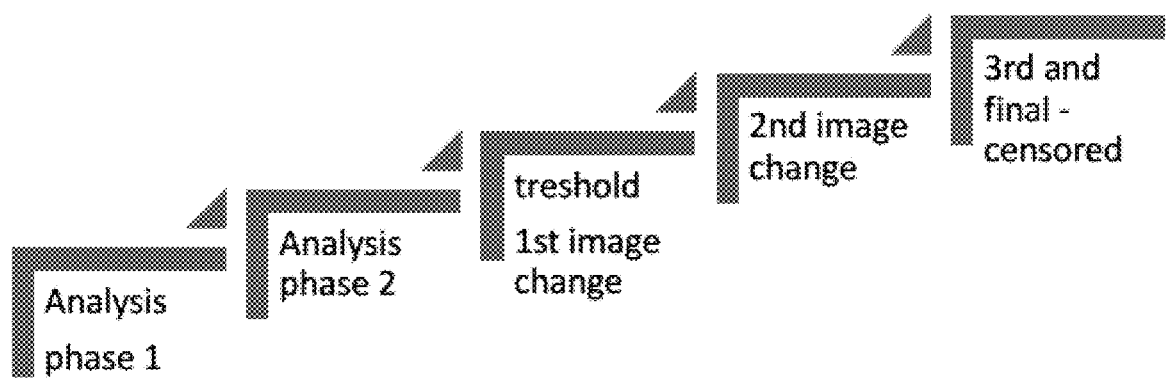
FIG. 13 conceptually illustrates breach thresholds and corresponding actions taken on avatars, in accordance with embodiments of the disclosure.

In embodiments involving marking as one of the actions taken on avatars, it is noted that decisions whether and how to mark may be performed in any desired manner. FIG. 13 illustrates one example, in which multiple thresholds exist, and monitoring and marking proceeds in stages or phases according to which threshold is breached if any. In the example of FIG. 13, phase 1 and phase 2 may be triggered as behavior scores approach the first threshold (e.g., phase 1 may be triggered when behavior score reaches 50% of the first threshold, and phase 2 may be triggered at 75%, where any percentage values are contemplated). Phases 1 and 2 may trigger more frequent monitoring, or any other contemplated action. For instance, once behavior score reaches phase 1, an avatar may be monitored or have its actions determined and logged more often, e.g., once a minute, as compared to a default monitoring state of once every 5 minutes. Similarly, once behavior scores reach phase 2, avatars may be monitored or have their actions determined and logged every 30 seconds.

When behavior scores reach the first threshold, marking and unmarking module 506 may impose a first image change or visible marking on the breaching avatar, such as a change in color, change in shape, another imposed visual effect such as an aura, or any other desired visual effect. Shape changes may be any changes, such as addition of an item or effect to an avatar (e.g., added horns, clothing, etc.), or a change in avatar shape, such as increasing an avatar's girth or height so that it may have difficulty passing through narrow or low corridors.

When behavior scores reach the second threshold, marking and unmarking module 506 may impose a second image change on the breaching avatar, which may be a more severe form of the first image changes imposed. For example, module 506 may color the breaching avatar a darker color than that imposed at the first image change, add additional features such as horns or the like, further grow or shrink the avatar, add an additional sign or banner, or any other desired action. A subsequent breach of the third threshold may result in censoring of the avatar, e.g., muting, suspension, banning, or the like. Once any of these thresholds is reached, the avatar may be monitored for a predetermined duration, and if its play returns to acceptable game play, marking and unmarking module 506 may impose a remedial action on the avatar, such as removing any imposed avatar markings, allowing the avatar to resume game play, or the like.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, behavior scores may be determined in any manner, according to any detected behavior. Any actions may be performed on avatars, according to any one or more thresholds or other criteria. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method comprising:
monitoring, using control circuitry, avatar behavior in a computer-generated environment;
generating a first performance score for a first avatar based at least in part on the monitored avatar behavior;
detecting a dispute between the first avatar and a second avatar in the computer-generated environment;
monitoring the behavior of the first avatar in the computer-generated environment after the detected dispute;
generating a second performance score based at least in part on the monitored behavior of the first avatar in the computer-generated environment after the detected dispute, wherein the second performance score is lower than the first performance score due to inaction of the first avatar in the computer-generated environment; and
altering of a visible property of the first avatar in the computer-generated environment, the altering being based at least in part on a comparison of the first performance score to the second performance score.

2. The method of claim 1, wherein the detecting a dispute further comprises one or more of detecting abusive language from an audio signal corresponding to the first avatar and/or the second avatar, or detecting inappropriate interactions between the first avatar and the second avatar in the computer-generated environment.

3. The method of claim 2, wherein the detecting inappropriate interactions further comprises detecting one or more of a failure of the first avatar and/or the second avatar to perform a prescribed role, an inaction of the first avatar and/or the second avatar, an inappropriate gesture, or a change in behavior of the first avatar and/or the second avatar.

4. The method of claim 1, wherein the altering of the visible property further comprises initiating the altering in the computer-generated environment when a difference between the first performance score and the second performance score exceeds a predetermined threshold.

5. The method of claim 4, wherein the altering of the visible property further comprises initiating the altering in the computer-generated environment when the difference between the first performance score and the second performance score exceeds the predetermined threshold for longer than a predetermined amount of time.

6. The method of claim 1, further comprising:
monitoring the behavior of the first avatar in the computer-generated environment after the generating of the second performance score;
generating a third performance score based at least in part on the monitored behavior of the first avatar in the computer-generated environment after the generating of the second performance score; and
initiating a remedial action on the first avatar when a difference between the first performance score and the third performance score falls below a predetermined threshold.

7. The method of claim 1, further comprising initiating a remedial action on the first avatar when the difference between the first performance score and the second performance score falls below the predetermined threshold for longer than a predetermined amount of time.

8. The method of claim 1, wherein the altering of a visible property of the first avatar comprises initiating an applying of a graphical element to the first avatar and/or initiating a removing of the first avatar from the computer-generated environment.

9. The method of claim 1, wherein the altering of a visible property of the first avatar further comprises initiating a permanent marking of the first avatar when a difference between the first performance score and the second performance score exceeds a predetermined threshold at least a predetermined number of times.

10. The method of claim 1, further comprising storing the first performance score and the second performance score in a memory.

11. A system comprising:
a storage device; and
control circuitry configured to:
monitor avatar behavior in a computer-generated environment;
generate a first performance score for a first avatar based at least in part on the monitored avatar behavior;
detect a dispute between the first avatar and a second avatar in the computer-generated environment;
monitor the behavior of the first avatar in the computer-generated environment after the detected dispute;
generate a second performance score based at least in part on the monitored behavior of the first avatar in the computer-generated environment after the detected dispute, wherein the second performance score is lower than the first performance score due to inaction of the first avatar in the computer-generated environment; and
alter a visible property of the first avatar in the computer-generated environment, the altering being based at least in part on a comparison of the first performance score to the second performance score.

12. The system of claim 11, wherein the detecting a dispute further comprises one or more of detecting abusive language from an audio signal corresponding to the first avatar and/or the second avatar, or detecting inappropriate interactions between the first avatar and the second avatar the computer-generated environment.

13. The system of claim 12, wherein the detecting inappropriate interactions further comprises detecting one or more of a failure of the first avatar and/or the second avatar to perform a prescribed role, an inaction of the first avatar and/or the second avatar, an inappropriate gesture, or a change in behavior of the first avatar and/or the second avatar.

14. The system of claim 11, wherein the altering of the visible property further comprises initiating the altering in the computer-generated environment when a difference between the first performance score and the second performance score exceeds a predetermined threshold.

15. The system of claim 14, wherein the altering of the visible property further comprises initiating the altering in the computer-generated environment when the difference between the first performance score and the second performance score exceeds the predetermined threshold for longer than a predetermined amount of time.

16. The system of claim 11, wherein the control circuitry is further configured to:
monitor the behavior of the first avatar in the computer-generated environment after the generating of the second performance score;
generate a third performance score based at least in part on the monitored behavior of the first avatar in the computer-generated environment after the generating of the second performance score; and initiate a remedial action on the first avatar when a difference between the first performance score and the third performance score falls below a predetermined threshold.

17. The system of claim 11, wherein the control circuitry is further configured to initiate a remedial action on the first avatar when the difference between the first performance score and the second performance score falls below a predetermined threshold for longer than a predetermined amount of time.

18. The system of claim 11, wherein the altering of a visible property of the first avatar comprises initiating an applying of a graphical element to the first avatar and/or initiating a removing of the first avatar from the computer-generated environment.

19. The system of claim 11, wherein the altering of a visible property of the first avatar further comprises initiating a permanent marking of the first avatar when a difference between the first performance score and the second performance score exceeds a predetermined threshold at least a predetermined number of times.

20. The system of claim 11, wherein the control circuitry is further configured to store the first performance score and the second performance score in a memory.

\* \* \* \* \*